United States Patent Office 3,323,829
Patented June 6, 1967

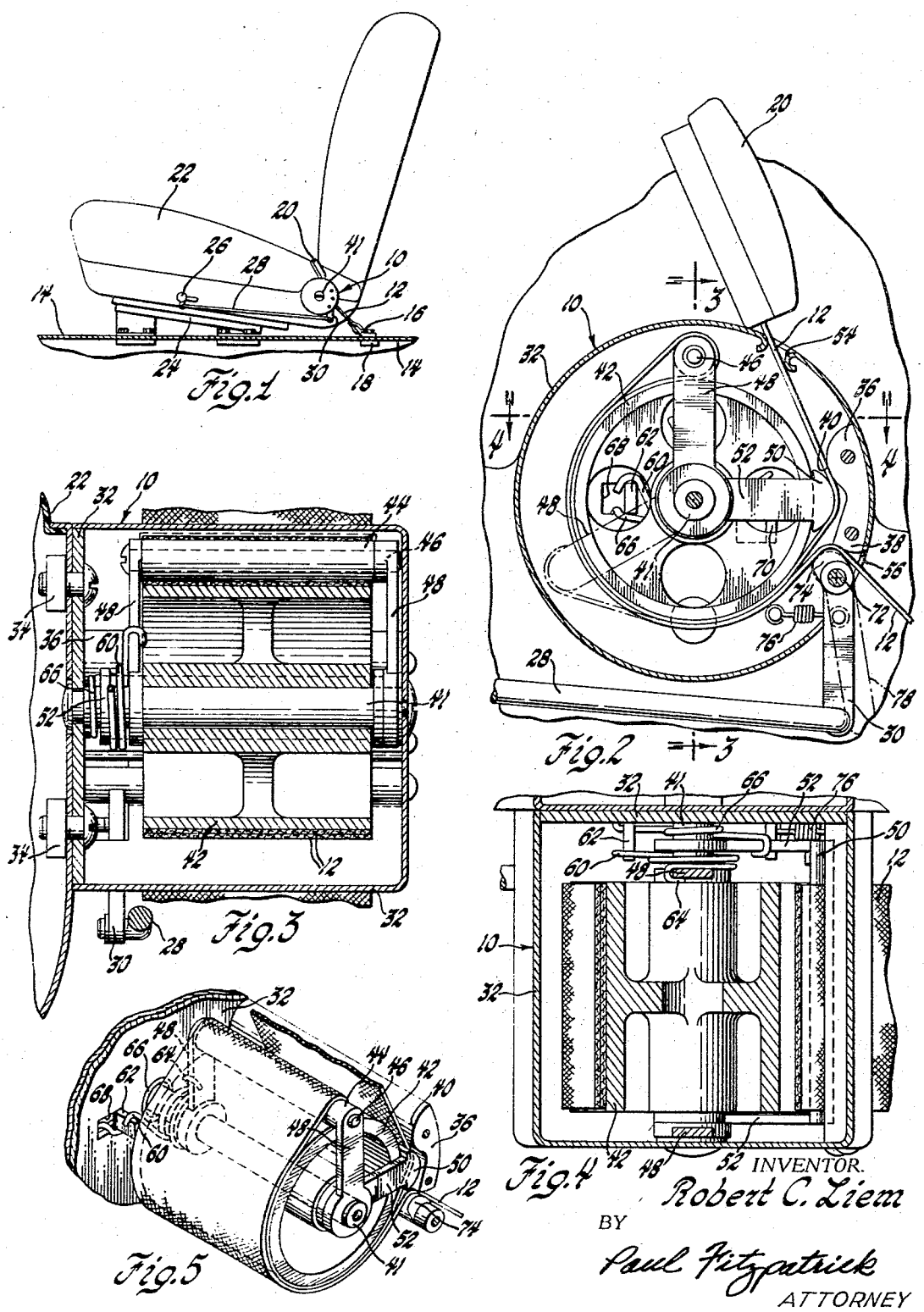

3,323,829
SEAT BELT RETRACTOR
Robert C. Liem, Rochester, Mich., assignor to General Motors Corporation, Detroit, Mich., a corporation of Delaware
Filed Jan. 19, 1966, Ser. No. 521,643
5 Claims. (Cl. 296—65)

This invention relates to safety restraining devices for passengers in vehicles, and more particularly a safety seat belt retractor arrangement.

The increased popularity of safety seat belts in vehicles has resulted in a variety of different retractor devices. Many of these retractor devices are mounted on the side of the vehicle seat. This often presents a problem when it is desired to have the seat belt attached to the vehicle floor and yet be able to adjust the position of the seat. This movement of the vehicle seat often results in the necessity of re-adjusting the length of the safety belt which is restraining the user within the vehicle seat.

It is, therefore, an object of this invention to provide a safety belt retractor which automatically re-adjusts the belt length to compensate for fore and aft movements of the vehicle seat. The retractor embodying this invention is mounted preferably on the side of the vehicle seat between the vehicle floor anchorage and the wearer and also functions as a conventional seat belt retractor.

Other objects, features and advantages of the subject invention will become apparent upon reference to the following detailed description and the drawings depicting the preferred embodiment thereof, wherein:

FIGURE 1 is an elevation view of the invention as used in connection with a vehicle seat;

FIGURE 2 is a sectional view of a retractor assembly embodying the invention;

FIGURE 3 is a sectional view looking in the plane of arrows 3—3 in FIGURE 2;

FIGURE 4 is a sectional view looking in the plane of arrows 4—4 in FIGURE 2; and FIGURE 5 is a perspective view of the retractor assembly with its outer casing removed.

As seen in FIGURE 1, the subject invention embodies a retractor assembly 10 which is used in conjunction with a safety belt 12 which is fastened at one end to the vehicle floor 14 by means of a flange 16 and bolted assembly 18 and which has a buckle member 20 at its opposite end. The retractor assembly 10 is suitably mounted on the lower side portion of a vehicle seat 22. The vehicle seat 22 may be of any suitable type and will have another seat belt assembly (not shown) with a latch plate adapted to engage the buckle 20 on the belt 12 to hold the wearer in the seat 22. The seat 22 is mounted to the vehicle floor through an adjustable seat mechanism 24 which provides a variety of positions for the seat relative to the floor. The position of the seat 22 is controlled by a seat actuation lever 26 which can be moved to unlock the seat adjusting mechanism 24 to thereby allow for movement of the seat relative to the floor. As shown in FIGURE 1, a connecting rod 28 is attached to the seat adjusting lever 26 and connects to a lever 30 on the retractor assembly 10.

The structural details of the retractor assembly 10 are more clearly seen by reference to FIGURES 2 through 5. The retractor assembly 10 is housed within a cylindrical casing 32 which is fastened to the vehicle seat by bolts 34. The casing 32 has fastened to it a fixed member 36 which has a relatively blunt stop surface 38 at one end and a cam surface 40 at its other end. Mounted on a shaft 41 within the retractor casing 32 is a reel 42 about which the belt 12 is wound. The reel 42 may be either fixed to the shaft 41 or rotatable with respect thereto as will be discussed later. A rotatable roller 44 is mounted on a shaft 46 which in turn is mounted so as to be movable around the circumference of the reel 42 by a pair of pivot arms 48 which rotate about the shaft 41. Thus, the roller 44 is free to roll about the circumference of the reel 42 on the pivot arms 48. A bar 50 of lenticular cross-section is likewise mounted for movement around the circumference of the reel 42 by a pair of pivot arms 52 which also rotate on the shaft 41. The safety belt 12 (as shown in FIGURE 2) passes from the buckle 20 through an opening 54 in the case 32, around the circumference of the reel 42 and around the rotating roller 44, back around circumference of the reel 42, thereby overlying itself, and out through another opening 56 in the casing 32 to the clamp 16 fixed to the vehicle floor 14.

As best seen in FIGURE 4, a first spring 60 anchored at one end around a tab 62 struck from the casing 32 is wrapped around the shaft 41 and terminates in a hooked portion 64 which engages one of the pivot arms 48 leading to the roller 44. This first spring 60 acts to hold the roller 44 in the position shown in solid lines in FIGURE 2, and thereby serves the purpose of a retractor spring in that it tends to hold the roller 44 in a position so as to pull the maximum amount of the belt 12 into the retractor 10 at both ends. A second spring 66 has one end which hooks into an aperture 68 in the casing 32 formed by the displacement of the tab 62. Spring 66 wraps around the shaft 41 and hooks around a pivot arm 52 leading to the bar 48. The action of this second spring tends to force the bar 50 in a clockwise direction as seen in FIGURE 2 and results in the movement of the bar 50 and pivot arm 52 against a tab 70 which is struck from the casing 32. Thus, a clearance space is created between the bar 50 and the cam surface 40 of the lock member 36 to allow for the free movement of the belt 12 between them. However, a strong pull on the belt 12 will result in enough friction between the bar 50 and the belt 12 to move the bar 50 into contact with the cam surface 40 thereby locking the belt 12 against withdrawal. Such friction load between the bar 50 and the belt 12 will occur only when a strong force is applied to the belt 12, such as when the wearer moves upon deceleration of the vehicle. Thus, the bar 50 is effectively an inertia responsive locking means for the belt 12.

As mentioned previously, a lever 30 attached to the seat unlocking lever 26 through rod 28 is pivoted about axis 72 so that its end 74 is positioned to lock the belt 12 against the blunt end 38 of the fixed member 36. A spring 76 connects the lever 30 and the casing 32 of the retractor mechanism so as to maintain the lever arm in a position so that the belt 12 is normally locked between the lever end 74 and the fixed member 38. Upon release of the seat actuation means through the pivoting of the lever 26, the lever arm 30 rotates to the position shown in dashed lines 78 thereby moving the end portion 74 away from the fixed member 38 and allowing the belt 12 to move freely between these two members.

The operation of this apparatus is as follows. It should be noted first that the position of the seat can be changed thereby changing the length of the belt between the retractor and the floor without effecting the adjustment of the belt around the wearer and also that the belt around the wearer can be adjusted without changing the length of the belt between the retractor and the floor. In its retracted position, as shown in solid lines in FIGURE 2, the roller 44 is pivoted around reel 42 by the first spring 60 such that the belt buckle is retracted to the retractor and the length of the belt connected to the floor is also retracted into the retractor and locked to the retractor. Thus, if the wearer decides to adjust the position of the seat, he releases the seat adjusting means by pivoting the lever 26 which unlocks the belt 12 and allows for movement of the vehicle seat relative to the floor and the corresponding movement of the seat belt 12 to compensate for the new position of the seat. Upon attainment of the desired seat position, the seat adjustment lever 26 is released thereby locking the seat adjustment mechanism and locking the belt 12 to the retractor against movement to or from the floor. The wearer can then pull the buckle 20 around his waist thereby withdrawing the belt 12 from within the retractor such that the roller 44 pivots about the shaft 41 around the circumference of the reel 42 against the retracting action of the spring 60. The reel 42 may be fixed so that the belt 12 merely rests thereon and slides therearound or it may be free to rotate so the belt 12 need not slide relative thereto. It should be noted that the belt may be constructed of a material having a low coefficient of friction such that it will not cause the overlying layers of belt extending around the reel 42 to bind together under the force of the spring, thereby eliminating the possibility of a snubbing action. It should be clear that if this withdrawal of the belt 12 toward the buckle 20 is a relatively slow and even, the belt will slide over the bar 50 and the force of the spring 66 will be sufficient to keep the bar 50 from locking the belt 12 against withdrawal from the retractor. However, upon any sudden or strong movement of the belt 12 the friction between the belt 12 and the bar 50 will cause the bar 50 to rotate counterclockwise as shown in FIGURE 2 so as to lock the belt 12 by the bar 50 and the cam surface 40 of the fastened member 36. This then provides an inertially responsive locking means for the belt 12 when it is in use around the wearer.

Therefore, it can be seen that the subject invention as embodied in the retractor mechanism as described provides a retractor for a safety seat belt which can be positioned on the side of a vehicle seat so as to retract the safety seat belt to the retractor both from the user and from the floor. It also provides a retracting mechanism which can be used in connection with the seat adjusting mechanism so as to allow the belt to be adjusted for movements of the seat without affecting the position of the belt around the wearer. It further provides a seat belt retractor which features an inertial locking mechanism to prevent the movement of the wearer of the belt upon sudden exertion of forces on the belt which would tend to withdraw the belt from the retractor, such as deceleration on the vehicle.

Although but one embodiment of the subject invention has been shown and described in detail, it should be clear to those skilled in the art to which the invention pertains that many changes and modifications may be made thereto without departing from the scope of the invention.

I claim:
1. Restraining apparatus in a vehicle including, in combination:
   an adjustable seat attached to said vehicle;
   a seat occupant restraining safety belt anchored to said vehicle;
   a retractor mounted on said seat to take up slack in said safety belt between said seat and said vehicle including a brake to lock said belt to said retractor;
   and means responsive to the adjustment of said seat to release said brake and unlock said belt.

2. Restraining apparatus in a vehicle as set forth in claim 1 wherein said brake on said retractor includes a fixed stop surface on said retractor, a lever means pivotable against stop surface and connected to said means responsive to adjustment at said seat, and a resilient means biasing said lever against said stop surface to lock the belt therebetween.

3. Restraining apparatus in a vehicle as set forth in claim 1 wherein said retractor mounted on said seat is positioned on an intermediate portion of said belt and is adapted to also retract the belt from around the occupant when not in use.

4. Restraining apparatus in a vehicle as set forth in claim 3 wherein said retractor includes a reel, a roller rotatably mounted to pivot about said reel, said belt being wrapped around a portion of the circumference of said reel and around said roller, and a first spring biasing said roller in a direction so as to retract it around said reel.

5. Restraining apparatus in a vehicle as set forth in claim 4 wherein said retractor further includes an inertial locking means for the portion of said belt extending to said occupant, said inertial locking means comprising a cam surface on said retractor, a bar mounted to rotate about said reel into contact with said cam surface to lock said belt therebetween, and a second spring biasing said bar out of contact with said cam surface, said bar having an end portion over which said belt passes and which moves with said belt when a sufficient inertially inspired friction force exists to pivot into contact with said cam surface against the force of said spring to lock said belt.

References Cited

UNITED STATES PATENTS 2,814,504  11/1957  Campbell et al. ___ 242—107.1 X
3,211,496  10/1965  Zaydel _____ 280—150
3,248,149  4/1966   Carter _____ 280—150

BENJAMIN HERSH, *Primary Examiner.*

J. H. BRANNEN, *Assistant Examiner.*